June 2, 1942. R. J. BURROWS ET AL Re. 22,107

WHEEL

Original Filed July 10, 1936

Inventors:
Robert J. Burrows
Alfred O. Williams

By Mowry, Jackson, Butcher & Denner
Attys.

Reissued June 2, 1942

Re. 22,107

UNITED STATES PATENT OFFICE 22,107

WHEEL

Robert J. Burrows and Alfred O. Williams, Battle Creek, Mich., assignors to Clark Equipment Company, Buchanan, Mich., a corporation of Michigan Original No. 2,167,633, dated August 1, 1939, Serial No. 89,927, July 10, 1936. Application for reissue December 20, 1940, Serial No. 371,028

23 Claims. (Cl. 295—11)

This invention relates to wheels and is more particularly directed to resilient wheels for use on railway and other vehicles.

It has been found desirable, in connection with the development of light weight rail equipment, to design wheels which possessed sufficient resiliency so as to prevent objectionable jarring or vibration in the car body when the car is traveling at high speeds, and also to eliminate the transmission of sound from the rail to the tread of the wheel and thence thru metallic connections to the car. Due to the fact that the road beds of most lines have not been built especially for high speed trains it is necessary that the wheel be capable of absorbing, within itself, a considerable amount of the stresses and vibrations occasioned by passing over rail joints, switches and over tracks on an uneven road bed.

It is a primary object of the present invention to provide a special type of resilient wheel which possesses the characteristic of eliminating transmission of noise therethrough and is also sufficiently resilient to produce the desired riding qualities essential in high speed railway vehicles.

Another object of the present invention is to provide a wheel which can be readily assembled or disassembled, which is relatively light in weight, and which employs relatively few constituent parts.

In carrying out the present invention we preferably provide two sandwich-like stress carrying members disposed between the wheel body portion and the flange portion of a rim member. These cushioning members comprise bodies of rubber or equivalent material which are preferably enclosed on opposite faces by metallic plate members to which the surface of the rubber may be vulcanized. Each of these sandwich-like members constitutes an annular disc-like ring, clamped between an inwardly extending radial flange of the tread or rim of the wheel and a radially outwardly extending disc or flange carried by the hub. Suitable means is provided for placing these members in lateral compression, with means for limiting the compression of the members to a predetermined maximum in order to retain the resilient material in proper condition so that it will not be subjected to too great internal heating and consequent impairment of its desired operating characteristics.

Another feature of the present invention is the provision of means whereby equalized compression of the lateral surfaces of the resilient members can be attained in order that the shear stress under load will be substantially constant along the entire radial surfaces of these cushioning members. In this connection means are provided for limiting the lateral compression to insure that the lateral compression will be equalized from the inner periphery of these members to the outer periphery thereof, whereby the shear stress due to loading is distributed equally over all surfaces of the cushioning members.

Other objects and advantages of the present invention will appear more fully from the following detailed description which, taken in conjunction with the accompanying drawing, will disclose to those skilled in the art the particular construction and operation of a preferred form of the present invention.

Figure 1:
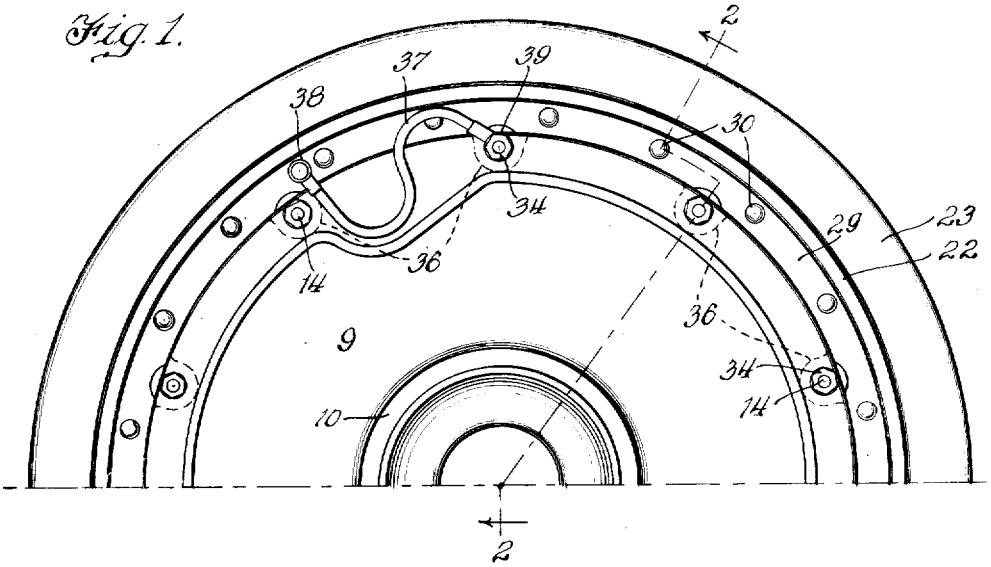
Figure 1 is a side elevational view of a portion of the wheel.

Referring now in detail to the drawing, we have provided a wheel hub 5 which may be of any desired shape or configuration and which is adapted to be pressed over the axle or spindle in any suitable manner, as is usual practice in railway truck construction. The hub 5 is provided with a reduced threaded end portion 6 and with an enlarged external cylindrical surface 7 extending about the opposite end of the hub. The cylindrical surface 7 is reduced in diameter in the portion marked 8 for a purpose which is hereinafter disclosed.

Pressed over the external surface of the hub 5 is a flange member 9 which has a cylindrical hub portion 10 preferably tightly engaging about the surface 7 of the hub 5 and suitably secured in fixed position thereon as by means of the annular ring weld 12, altho it may be secured in position in any other equivalent manner. At its outer periphery the flange member 9 is provided with a series of circumferentially spaced openings adapted to receive the corresponding projecting ends 14 of a series of stud members 13. Each of these stud members has an oppositely extending reduced threaded end portion 14 forming an abutment shoulder with the central portion of the stud.

Figure 3:
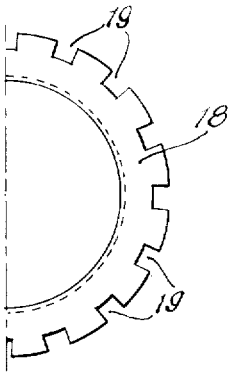
Figure 3 is an end elevation of the clamping ring.

Disposed in abutting engagement with the inner end of the flange member 9 and loosely fitting the reduced portion 8 of the external surface of the hub is a spacing sleeve 15 which is adapted to be engaged at its opposite end by a second flange member 16 which has a hub engaging portion providing for sliding engagement of member 16 with respect to the reduced surface portion 8 of the hub 5 and which is provided with a laterally spaced annular projection 17 at its inner end forming a radial abutment engaged by the inner face of the threaded ring 18, as shown in detail in Figure 3.

The ring is internally threaded to engage the threaded portion 6 of the hub and has spaced notches 19 formed in its outer periphery for engagement by suitable wrench means to tighten the ring on the hub. A suitable locking pin 20 carried by the projection 17 of the flange member 16 is adapted to be disposed within one of the notches 19 of the ring when the ring has been tightened in position in order to hold the ring against displacement.

It will be apparent that the spacing sleeve 15, together with the radially extending flange members 9 and 16, form a relatively deep outwardly opening channel which is adapted to receive the radial inwardly extending flange portion 22 formed integral with the rim portion 23 of the wheel. The rim 23 of the wheel is provided with the frusto-conical tread surface 24 which rolls along the rail 25.

Disposed within the channel formed between members 9, 15 and 16 on opposite sides of the flanged portion 22 are the cushioning members indicated generally at 26 and 27. Each of the members 26 and 27 comprises an annular disc-like portion of rubber or equivalent resilient material enclosed at the lateral surfaces thereof by the metallic plate members 28 and 29. The plate members 28 are extended substantially to the outer periphery of the flange members 9 and 16 and have abutting engagement with the adjacent surfaces thereof.

Figure 2:
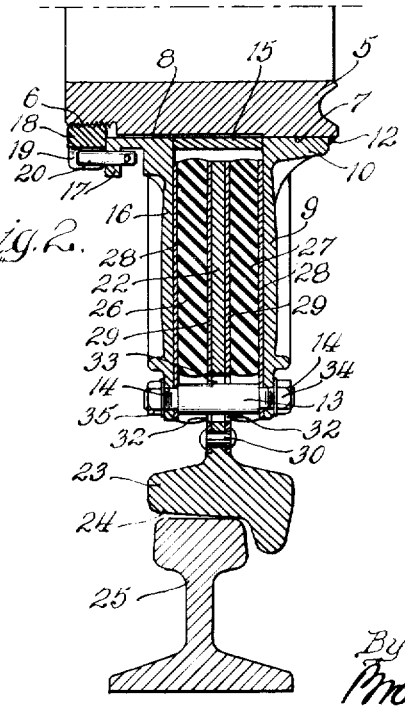
Figure 2 is a sectional view taken substantially on the line 2—2 of Figure 1.

These plates are provided with circumferentially spaced openings at their outer peripheries of a size such as to receive the threaded projecting portions 14 of the studs 13. The plates 29 extend outwardly beyond the outer peripheries of members 9 and 16 and are secured to the flange portion 22 of the member 23 by means of a plurality of rivets 30 extending therethru as indicated in Figure 2. The outer peripheral edges of the plates 29 have seating engagement against shoulders formed adjacent the juncture between the flange portion 22 and the member 23 to definitely locate the plates with respect to the flange.

The plates 29 are provided with enlarged openings 32 which extend about the enlarged central portion of the studs 13 and are capable of relative movement with respect thereto. The flange portion 22 is also provided with a corresponding enlarged opening 33 thru which the studs 13 are adapted to extend. The resilient members 26 and 27, may, if desired, be vulcanized to the adjacent surfaces of the plates 28 and 29 to form in effect resilient disc-like members having outer metallic planar surfaces.

The plates 28 and 29 are of distinct advantage, even when the members 26 and 27 are not vulcanized thereto, because the engaging surfaces thereof can be more readily and cheaply treated specially, or roughened, than the flanges 9 and 16, to provide a surface having the proper grip for preventing creep of the rubber when compression only is provided for carrying the radial loads.

In assembling the wheel the cushioning members are placed upon opposite sides of the flange portion 22 and these members are then moved into abutting engagement with the member 9. The studs 13 which are clamped by the nuts 34 to the outer periphery of member 9 thus extend thru the openings 32 and 33 and thru the corresponding opening in the plate member 28 carried by the resilient member 26.

The flange member 16 is then moved axially of the hub 5 into abutting engagement with plate 28 and a suitable nut 35 is threaded over the corresponding ends of studs 13 in order to dispose the member 16 in alinement therewith. By threading the ring 18 inwardly on the hub the inner portions of the members 26 and 27 are subjected to lateral compression limited only by the length of the sleeve member 15. The length of this sleeve member corresponds to the length of the enlarged central portion of the studs 13 whereby upon tightening of the nuts 34 and 35 the outer edges of the flange member 9 and 16 are drawn together to correspondingly compress the outer ends of the members 26 and 27. Thus a uniform lateral compression of the members 26 and 27 is effected throughout their radial length and all portions of the members 26 and 27 will be correspondingly stressed after the desired compression has been obtained. The lock pin 20 is inserted into position and the nuts 34 and 35 are held in tightened position by means of lock washers or any other suitable means to maintain the cushioning members at the desired compression during use of the wheel.

The outer peripheries of the members 26 are preferably notched as indicated at 36 in Figure 1 to extend about the enlarged portions of the studs 13 so that the studs may have some relative movement with respect to these members upon variations in loading on the wheel.

It will thus be apparent that the vertical load carried by the wheels will subject the members 26 and 27 to shear stress only and that the tread member 23 will be resiliently supported out of metallic contact with the wheel body portion comprising the members 5, 9 and 16. Thus no transmission of vibration or noise is possible due to the interpositioning of the members 26 and 27 between the flange 22 and the members 9 and 16. Also the members 26 and 27 will support the load imposed on the wheel in such manner as to be subjected only to shear stress so that relatively heavy stressing of the cushioning material is possible. By limiting the amount of lateral compression that can be imposed on the cushioning material, its wearing qualities and its resilient characteristics will be retained for a considerably longer period of time than would be possible if this lateral compression could be increased beyond the desired predetermined limits.

In view of the fact that certain signal apparatus and the like is operated by the shunting of track circuits thru the car wheels, it is desirable that electrical connection be made between the tread member 23 and the hub member 5 since the members 26 and 27 otherwise both mechanically and electrically insulate these two portions of the wheel. For this reason we have provided the jumper connection 37 shown in Figure 1 which is connected between the flange portion 22 of the member 23 as indicated at 38 and one of the studs 13 as indicated at 39. This provides an effective electrical connecting path between the tread and the hub of the wheel.

It will thus be obvious that we have provided a simplified type of resilient type wheel construction which is capable of easy assembly and relatively longer wearing characteristics and eliminates any mechanical interconnection between these members to reduce the transmission of vibrations and noises from the rails to the car body.

While we have disclosed and illustrated only one form of our present invention it is to be understood that the invention is susceptible to numerous changes and modifications and we do not intend to be limited except as defined by the scope and spirit of the appended claims.

We claim:

1. In combination, a hub having an outwardly directed radially extending channel, a tread member having a radially inwardly directed flange disposed within said channel, resilient cushioning rings disposed between the inner radial faces of said channel and the opposite radial surfaces of said flange each having side plates vulcanized thereto and engaging said faces and surfaces, one plate of each ring extending radially outwardly beyond the ring and secured to said flange of said tread member, means engaging said hub for exerting an axial compressive force at the inner end of said channel, and stud means about the radial outer periphery of said channel for exerting an axial compressive force about said periphery whereby uniform lateral compression of said rings is secured and for clamping the other plate of each ring to the outer periphery of said channel.

2. A wheel having a radially outwardly directed channel, a rim having a radially inwardly directed flange in said channel, cushioning means between said flange and the parallel inner walls of said channel each comprising annular discs of rubber disposed between thin metallic plates, one plate of each disc extending radially outwardly thereof, means about the outer periphery of said rim flange engaging said extending plates radially outwardly of said discs, means at the outer periphery of said channel alining said plates with respect to said channel and adapted to produce lateral compression of said rubber, and means at the inner end of said channel for producing corresponding lateral compression of said rubber.

3. A wheel comprising a hub portion having relatively movable radial flanges, a sleeve between said flanges at the inner end thereof, a rim member radially spaced from said flanges having a flange extending radially inwardly between said hub flanges, cushioning means between adjacent faces of said flanges, means securing said cushioning means to said rim member radially outwardly of said hub flanges, stud means circumferentially spaced about the outer periphery of said hub flanges aligning said cushioning means with respect to said hub and limiting relative movement between said hub flanges, said stud means and said sleeve limiting the lateral compression effective on said cushioning means due to relative movement of said hub flanges.

4. Cushioning means for resiliently supporting a rim member on a hub comprising an annular disc-like ring of resilient material, thin metallic plates secured to the opposite faces of said ring, one plate of said ring extending radially outwardly therebeyond and secured at its outer periphery to said rim member alined circumferentially spaced openings in said plates about their outer periphery, the outer periphery of said ring having inwardly notched-out portions alined with each of the pairs of openings in said plates, and means extending through said openings for securing the other plate of said ring to the periphery of said hub.

5. In combination, a cylindrical hub member, a radially flanged member rigidly secured to the external surface of said hub member adjacent one end thereof, a rim member having a radially inwardly extending flange having its inner peripheral edge spaced from said hub member, a sleeve on said hub member abutting against one face of said flanged member, a second radially flanged member movable axially along said hub member and adapted to have abutting engagement with said sleeve, resilient cushioning means between each of said flanged members and said rim flange, means spaced about the peripheries of said flanged member for aligning said cushioning means coaxially therewith and having enlarged central portions of a length equal to the axial length of said sleeve, means carried by said aligning means for forcing the outer peripheries of said flanged members toward each other, and means carried by the opposite end of said hub member for forcing said second flanged member into abutting engagement with said sleeve, whereby said cushioning means are subjected to substantially uniform compression throughout their radial extent.

6. A wheel comprising a hub having two radially extending flanges, one held rigidly on the hub and the other axially slidable thereon, a pair of resilient cushioning members, each of said members having metallic plates on opposite lateral surfaces, one plate of each member extending radially therebeyond, a rim member having a flange extending radially inwardly between said hub flanges and spaced therefrom by said cushioning members, and means respectively securing the outer periphery of the hub flange-engaging plates of each of said cushioning members rigidly to said hub flange and said extended portions of the rim flange engaging plates to said rim flange.

7. Cushioning means for a resilient wheel having a pair of hub flanges and a rim flange extending parallel to and between said hub flanges, comprising resilient disc-like members having planar metallic side plates, a series of peripheral studs having enlarged central portions and clamping the outer plates to said hub flanges adjacent the peripheries thereof, and means rigidly securing said inner plates to opposite sides of said rim flange.

8. A cushioning member adapted for mounting between a radially inwardly extending rim flange and a parallel radially outwardly extending hub flange, said member comprising a disc of resilient material confined between thin plate members bearing respectively against adjacent faces of said flanges, and independent means for locking each of said flanges and the adjacent contacting plate members rigidly together at their outer peripheries while permitting independent relative movement of said flanges.

9. A cushioning member adapted for mounting between a radially inwardly extending rim flange and a parellel radially outwardly extending hub flange, said member comprising a disc of resilient material confined between thin plate members bearing respectively against adjacent faces of said flanges, means comprising shouldered studs passing freely through said rim flange for clamping said hub flange and the adjacent plate member rigidly together, and independent means disposed radially outwardly of said studs for rigidly clamping the other plate member to said rim flange.

10. The combination, with a rim member having a radially inwardly directed flange and a hub member having a radially outwardly directed flange, of cushioning means therebetween comprising an annular resilient disc carrying thin metallic plates on its opposite lateral surfaces, one of said plates extending radially outwardly beyond said disc, means for clamping the extending portion of said one plate to said rim flange, and means extending transversely through said extending portion of said one plate for clamping the outer periphery of the other plate to the outer periphery of said hub flange, said one plate having an enlarged aperture receiving said last-named means and providing for relative radial movement of said plates.

11. The combination of claim 10 characterized by the provision of means for compressing the flanges against the plates adjacent the inner periphery of the cushioning means.

12. The combination, with a rim member having a radially inwardly directed flange and a hub member having spaced radially outwardly directed flanges on opposite sides of the rim flange, of cushioning means between each hub flange and said rim flange, said cushioning means each comprising an annular resilient disc carrying thin metallic plates on opposite lateral surfaces, stud means extending transversely through all said plates and spaced circumferentially about the outer peripheries of the hub flanges for clamping one plate of each cushioning means to the respective hub flange, and means extending transversely through the rim flange engaging plates radially outwardly of the hub flanges for clamping said last-named plates to the rim flange.

13. In combination, a hub having a fixed radially outwardly extending flange adjacent one end thereof, a second radially outwardly extending flange movable axially on said hub, a rim having a radially inwardly directed flange between said hub flanges, cushioning means between each hub flange and said rim flange comprising rubber discs having thin metallic plates bonded to the lateral faces thereof, a peripheral series of circumferentially spaced studs extending transversely through all said flanges and having shouldered portions providing a predetermined spacing between said hub flanges such as to produce predetermined compression of the outer peripheral portions of said cushioning means, said rubber discs having notched out portions at the periphery thereof clearing said studs, said rim flange having enlarged openings providing radial clearance about said studs, and means for anchoring the plates contacting opposite faces of the rim flange to said flange.

14. The combination of claim 13 further characterized in the provision of means engaging about one end of the hub for forcing said second hub flange axially toward said first hub flange to compress said cushioning means adjacent the inner peripheries thereof.

15. A wheel assembly comprising a hub portion having a radially outwardly directed annular channel defined by a fixed and an axially movable flange, a rim member having a radially inwardly directed flange extending into said channel, cushioning means each comprising a rubber disc with thin metallic plates on opposite lateral faces thereof disposed between said rim flange and each hub flange, said rim flange terminating short of said hub and said hub flanges terminating radially inwardly of the rim, a peripheral series of studs extending through said hub flanges and said rim flange, said rim flange having enlarged openings receiving said studs for accommodating relative radial movement of said rim flange with respect to said studs, shoulders on said studs between said hub flanges providing a predetermined spacing therebetween sufficient to compress the radial outer portions of said rubber discs against the rim flange, means on the hub for forcing the inner periphery of said movable hub flange toward the fixed hub flange to effect a similar compression of the radial inner portions of said discs, and means anchoring one plate of each of said cushioning means to the rim flange.

16. The wheel assembly of claim 15 wherein said rubber discs have substantially semi-circular notched out portions at said studs to provide radial clearance thereabout.

17. In combination, a hub having a fixed radially outwardly extending flange adjacent one end thereof, a second radially outwardly extending flange movable axially on said hub to a predetermined distance from said fixed flange, a rim having a radially inwardly directed flange between said hub flanges, cushioning means between each hub flange and said rim flange comprising rubber discs having thin metallic plates bonded to the lateral faces thereof, a peripheral series of circumferentially spaced studs extending transversely through all said flanges and having shouldered portions providing a predetermined spacing between said hub flanges such as to produce predetermined compression of the outer peripheral portions of said cushioning means, said rubber discs having recessed portions in the peripheries thereof providing radial clearance about said studs, said rim flange having enlarged openings providing radial clearance about said studs, and means for anchoring the plates adjacent said rim flange to said flange.

18. The combination of claim 17 further characterized in the provision of means on the hub for moving said second hub flange into position said predetermined distance axially from said first hub flange to compress said cushioning means adjacent the inner peripheries thereof.

19. A wheel assembly comprising a hub portion having a radially outwardly directed annular channel defined by a fixed and an axially movable flange, a rim member having a radially inwardly directed flange extending into said channel, cushioning means each comprising a rubber disc with thin metallic plates on opposite lateral faces thereof disposed between said rim flange and each hub flange, said rim flange terminating short of said hub and said hub flanges terminating radially inwardly of the rim, a peripheral series of studs extending through said hub flanges and said rim flange, said rim flange having enlarged openings receiving said studs for accommodating relative radial movement of said rim flange with respect to said studs, shoulders on said studs between said hub flanges providing a predetermined spacing therebetween sufficient to compress the radial outer portions of said rubber discs against the rim flange, means on the hub for locking the inner periphery of said movable hub flange a predetermined distance axially from the fixed hub flange to effect a similar compression of the radial inner portions of said discs, and means anchoring one plate of each of said cushioning means to the rim flange.

20. The wheel assembly of claim 19 wherein said rubber discs have axially directed recesses at the peripheries thereof about said studs to provide radial clearance thereabout.

21. In a resilient wheel, a hub having axially spaced radial flanges, a rim member having a radially inwardly directed flange intermediate said hub flanges, spring means separating said flanges and each comprising an elastic shear element having metallic members surface bonded to opposite faces thereof, means for securing the adjacent metallic members to said intermediate flange, the intermediate flange being relatively movable with respect to the hub flanges to impose shear loading on the elements, a plurality of bolts each extending transversely through said flanges, said members and said elements and having substantial clearance in said intermediate flange, the metallic members adjacent said intermediate flange, and said shear elements; said bolts having nuts on each end thereof to draw said hub flanges toward each other to compress said elements, said bolts each having shoulder portions near the ends thereof and a portion comprising dowel means for securing those metallic members adjacent said hub flanges to said flanges.

22. In a resilient wheel, a hub having axially spaced radial flanges, a rim member having a radially inwardly directed flange intermediate said hub flanges, spring means separating said flanges and each comprising an elastic shear element having metallic members surface bonded to opposite faces thereof, the intermediate flange being relatively movable with respect to the hub flanges to impose shear loading on the elements, a plurality of bolts each extending transversely through said flanges, said members and said elements and having substantial clearance in said intermediate flange, the metallic members adjacent said intermediate flange, and said shear elements; said bolts having nuts on each end thereof to draw said hub flanges toward each other to compress said elements, said bolts each having shoulder portions near the ends thereof and a portion comprising dowel means for securing those metallic members adjacent said hub flanges to said flanges, and means having an intermediate portion anchored in said intermediate flange and another part engaging an opening through each of said metallic members adjacent said intermediate flange to lock said adjacent metallic members to said intermediate flange.

23. In a wheel, a hub having two main relatively movable flanges radiating therefrom, a tire carrying flange between said main flanges, springs comprising elastic shear elements having metallic discs surface-bonded to each side thereof interposed between said tire carrying flange and each of said main flanges, a plurality of bolts extending transversely through said wheel in spaced relation with said shear elements and said tire carrying flange, said bolts each having shoulder portions in contact with the discs adjacent said main flanges, a nut on each end of each of said bolts drawing said discs and main flanges into non-slipping engagement, and means for locking said tire carrying flange and the adjacent discs of said shear elements together.

ROBERT J. BURROWS.
ALFRED O. WILLIAMS.